Aug. 5, 1952     F. J. LOGAN ET AL     2,606,065
INSECT REPELLENT DEVICE
Filed April 16, 1951

Floyd J. Logan
Oaty A. Trawick
INVENTORS

Patented Aug. 5, 1952

2,606,065

UNITED STATES PATENT OFFICE 2,606,065

INSECT REPELLENT DEVICE

Floyd J. Logan, Alabama City, and Oaty A. Trawick, Gadsden, Ala.

Application April 16, 1951, Serial No. 221,206

2 Claims. (Cl. 299—24)

1

This invention relates to new and useful improvements in insect repellers and the primary object of the present invention is to provide an absorbent member that is quickly and readily attached to or removed from a supporting structure, such as a screen or the like, for delivering the repellent in vaporous form to the atmosphere in order to repel insects such as flies, mosquitoes and the like.

Another important object of the present invention is to provide an absorbent body member having an absorbent covering that will be saturated with a repellent liquid and which is relatively small and light to be suspended from a screen or other such structural element.

A further object of the present invention is to provide a small and compact insect repelling device including a U-shaped clip for detachably securing the device to a screen in order to repel insects from the screen on which the device is supported.

A still further object of the present invention is to provide an insect repeller that is extremely simple and practical in construction, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
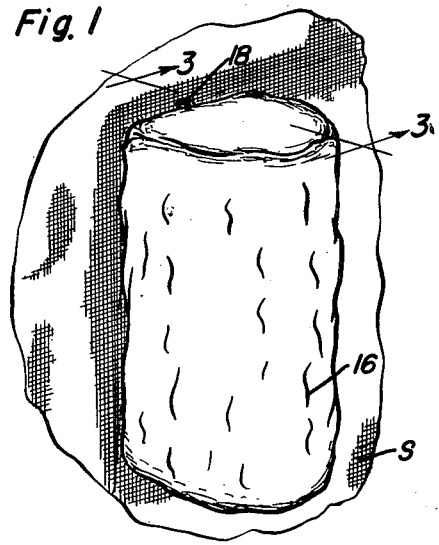
Figure 1 is a perspective view showing the present invention attached to a supporting screen.
Figure 2:
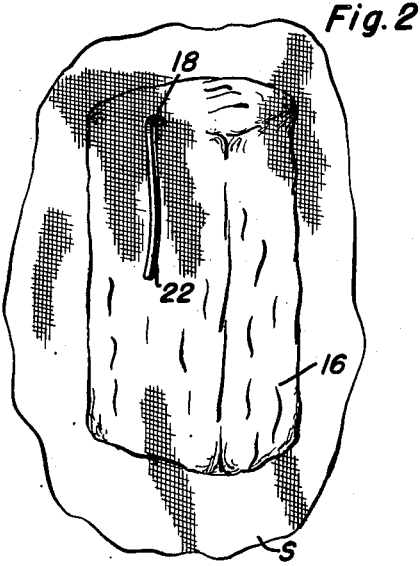
Figure 2 is a rear view of Figure 1.
Figure 3:
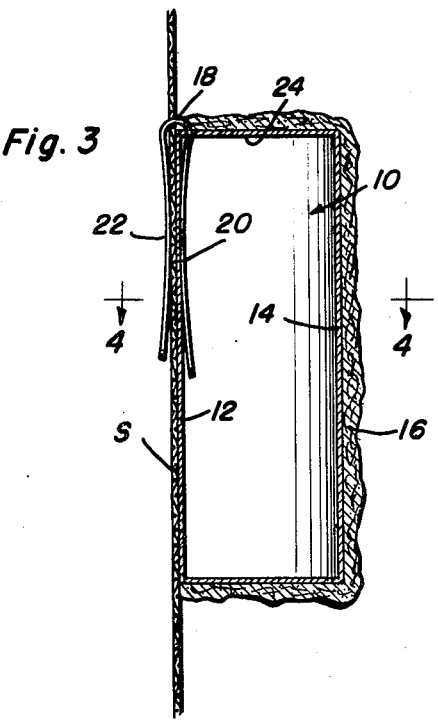
Figure 3 is a vertical sectional view taken substantially on the plane of section line 3—3 of Figure 1.
Figure 4:
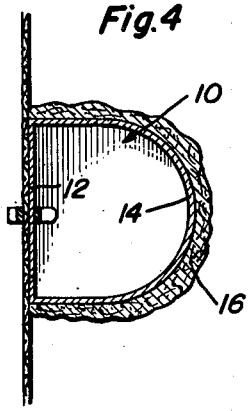
Figure 4 is a horizontal sectional view taken substantially on the plane of section line 4—4 of Figure 3.

Referring now to the drawings in detail, wherein for the purposes of illustration, there is disclosed a preferred embodiment of the present invention, the numeral 10 represents an elongated hollow body of bendable absorbent material, such as cardboard or the like, including a flat rear vertical wall 12 and a concavo-convex or curved forward wall 14 that is joined with the side edges of the wall 12.

An absorbent covering 16 completely encloses the body member 10. The covering 16 is preferably of cotton or other such soft absorbent material that will retain a large quantity of suitable repellent liquid in which the device is placed.

2

A substantially U-shaped clip 18 is provided for detachably securing the device to a supporting structure of screen S. The U-shaped clip 18 includes an inner leg portion 20 and an outer leg portion 22. The inner leg portion 20 of the U-shaped clip 18 extends through the upper wall 24 of the body member 10 and outer leg 22 of the U-shaped clip is disposed exteriorly of the rear wall 12.

In practical use of the present invention, the outer leg 22 of the clip 20 is extended through an opening in the screen S and the resilient character of the clip 18 yieldingly clamps the screen S between the leg portion 22 and the rear wall 12.

It is noted that the covering 16 applied to the rear wall 12 is relatively flat so that the device will rest against the screen without rocking or tipping in response to wind contacting the same. If desired, the covering applied to the wall 12 could be removed to establish a more desirable stabilizing action when the repellent device is supported upon the screen.

Any suitable well known repellent may be applied to the covering 16 inasmuch as the invention does not involve any particular type of repellent solution. Due to the absorbent characteristic of the body member 10, it is apparent that the body member 10 will also absorb a certain amount of repellent solution. It is further anticipated that the body member 10 be constructed of porous material so that it may be partially filled with a repellent solution to pass into the absorbent covering 16 and hence into the atmosphere.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. An insect repeller comprising an elongated body member of bendable absorbent material having a flat rear wall and a forward wall joined with the rear wall, an absorbent material completely covering the body member, and an attaching clip carried by the body member at its rear wall for attaching the body member to a supporting structure.

2. The combination of claim 1 wherein said body member includes an upper wall, said clip being U-shaped and including first and second legs, one of said legs entering the body member through its upper wall and the other of said legs being disposed exteriorly of said rear wall.

FLOYD J. LOGAN.
OATY A. TRAWICK.

REFERENCES CITED

The following references are of record in the file of this patent:

UNITED STATES PATENTS

| Number | Name | Date |
|---|---|---|
| 739,297 | Dayton | Sept. 22, 1903 |
| 1,056,134 | Vogelpohl | Mar. 18, 1913 |
| 1,158,757 | Welsch | Nov. 2, 1915 |
| 1,984,055 | Carter | Dec. 11, 1934 |